United States Patent
Thramann

(10) Patent No.: US 11,830,043 B2
(45) Date of Patent: Nov. 28, 2023

(54) APPARATUS, SYSTEM, AND METHOD FOR AUDIO BASED BROWSER COOKIES

(71) Applicant: Auddia Inc., Boulder, CO (US)

(72) Inventor: Jeffrey Thramann, Boulder, CO (US)

(73) Assignee: Auddia Inc., Boulder, CO (US)

( * ) Notice: Subject to any disclaimer, the term of this patent is extended or adjusted under 35 U.S.C. 154(b) by 0 days.

(21) Appl. No.: 18/164,182

(22) Filed: Feb. 3, 2023

(65) Prior Publication Data

US 2023/0259983 A1 Aug. 17, 2023

Related U.S. Application Data

(60) Continuation of application No. 16/278,678, filed on Feb. 18, 2019, now Pat. No. 11,599,915, which is a
(Continued)

(51) Int. Cl.
| | |
|---|---|
| *G06Q 30/0241* | (2023.01) |
| *G06F 16/638* | (2019.01) |
| *G06F 16/438* | (2019.01) |
| *H04L 65/60* | (2022.01) |
| *H04L 43/106* | (2022.01) |
| *H04N 21/858* | (2011.01) |
| *H04N 21/439* | (2011.01) |
| *H04N 21/81* | (2011.01) |

(Continued)

(52) U.S. Cl.
CPC ..... *G06Q 30/0277* (2013.01); *G06F 16/4387* (2019.01); *G06F 16/639* (2019.01); *G06Q 30/00* (2013.01); *H04L 43/106* (2013.01); *H04L 65/60* (2013.01); *H04N 21/4394* (2013.01); *H04N 21/812* (2013.01); *H04N 21/8358* (2013.01); *H04N 21/858* (2013.01); *H04L 67/02* (2013.01)

(58) Field of Classification Search
CPC .. G06Q 30/0277; G06Q 30/00; G06F 16/639; G06F 16/4387; H04L 65/60; H04L 43/106; H04L 67/02; H04N 21/858; H04N 21/4394; H04N 21/812; H04N 21/8358
USPC ...................................... 705/14.73
See application file for complete search history.

(56) References Cited

U.S. PATENT DOCUMENTS

| | | | |
|---|---|---|---|
| 5,809,085 A | 9/1998 | Goodson et al. | |
| 7,206,932 B1 * | 4/2007 | Kirchhoff | H04L 63/166 |
| | | | 726/11 |

(Continued)

OTHER PUBLICATIONS

Nittala, Aditya Shekhar, et al., "PhoneEar: Interactions for Mobile Devices that Hear High-Frequency Sound-Encoded Data", EICS '15, Duisburg, Germany, Jun. 23-26, 2015, pp. 174-179.*
(Continued)

*Primary Examiner* — Robert Stevens
(74) *Attorney, Agent, or Firm* — Perkins Coie LLP; Colin Fowler

(57) ABSTRACT

A system and method for providing digital audio services is described. One embodiment is a method for proving digital audio services, comprising receiving, using a communications interface, an audio stream from a content provider; determining a timestamp for a first audio stream segment; determining a timestamp for a second audio stream segment; updating a playlist with a representation of the audio stream; receiving a query for content information; and sending offer information, in response to receiving the query for content information.

20 Claims, 13 Drawing Sheets

Related U.S. Application Data continuation-in-part of application No. 16/219,675, filed on Dec. 13, 2018, which is a division of application No. 15/258,796, filed on Sep. 7, 2016, now abandoned, which is a continuation of application No. 13/660,733, filed on Oct. 25, 2012, now abandoned.

(60) Provisional application No. 62/632,595, filed on Feb. 20, 2018, provisional application No. 61/670,491, filed on Jul. 11, 2012, provisional application No. 61/551,307, filed on Oct. 25, 2011.

(51) Int. Cl.
*H04N 21/8358* (2011.01)
*G06Q 30/00* (2023.01)
*H04L 67/02* (2022.01)

(56) References Cited

U.S. PATENT DOCUMENTS

| | | | |
|---|---|---|---|
| 8,015,123 B2* | 9/2011 | Barton | G06Q 30/0251 84/603 |
| 8,321,534 B1 | 11/2012 | Roskind et al. | |
| 8,411,977 B1 | 4/2013 | Baluja et al. | |
| 9,571,874 B2* | 2/2017 | Bhatia | H04N 21/4788 |
| 2002/0183059 A1 | 12/2002 | Noreen et al. | |
| 2003/0093790 A1 | 5/2003 | Logan et al. | |
| 2005/0053020 A1 | 3/2005 | Thirumoorthy | |
| 2005/0182792 A1 | 8/2005 | Israel et al. | |
| 2005/0193016 A1 | 9/2005 | Seet et al. | |
| 2005/0219068 A1 | 10/2005 | Jones et al. | |
| 2006/0155399 A1 | 7/2006 | Ward | |
| 2007/0022867 A1 | 2/2007 | Yamashita | |
| 2007/0124756 A1 | 5/2007 | Covell et al. | |
| 2007/0239675 A1 | 10/2007 | Ragno et al. | |
| 2008/0051029 A1 | 2/2008 | Witteman et al. | |
| 2008/0065507 A1 | 3/2008 | Morrison | |
| 2008/0082510 A1 | 4/2008 | Wang et al. | |
| 2008/0092181 A1 | 4/2008 | Britt | |
| 2008/0294548 A1 | 11/2008 | Fowler et al. | |
| 2010/0113062 A1 | 5/2010 | Lee et al. | |
| 2010/0134278 A1 | 6/2010 | Srinivasan et al. | |
| 2010/0142715 A1 | 6/2010 | Goldstein et al. | |
| 2010/0198944 A1 | 8/2010 | Ho et al. | |
| 2010/0205626 A1 | 8/2010 | Miller et al. | |
| 2011/0125508 A1 | 5/2011 | Kelly | |
| 2011/0138020 A1 | 6/2011 | Pantos et al. | |
| 2011/0173208 A1 | 7/2011 | Vogel | |
| 2011/0289098 A1 | 11/2011 | Oztaskent | |
| 2012/0010996 A1 | 1/2012 | Horvitz et al. | |
| 2012/0023131 A1 | 1/2012 | Downey | |
| 2012/0036034 A1 | 2/2012 | Golden et al. | |
| 2012/0245995 A1 | 9/2012 | Chawla | |
| 2013/0052939 A1 | 2/2013 | Anniballi et al. | |
| 2013/0086466 A1 | 4/2013 | Levy et al. | |
| 2013/0151241 A1 | 6/2013 | Park et al. | |
| 2013/0212526 A1 | 8/2013 | Park et al. | |
| 2014/0164111 A1* | 6/2014 | Rodriguez | G06Q 30/0255 705/14.53 |
| 2014/0188412 A1 | 7/2014 | Mahajan et al. | |
| 2015/0341453 A1 | 11/2015 | Miller et al. | |
| 2016/0007083 A1* | 1/2016 | Gurha | H04N 21/25808 725/13 |
| 2016/0277793 A1* | 9/2016 | Eyer | H04H 60/73 |

OTHER PUBLICATIONS

Albasir et al., "Smart Mobile Web Browsing," ICAST 2013 & UMEDIA 2013, Aizu-Wakamatsu, Japan, Nov. 2-3, 2013, pp. 671-678.

Banerjee et al., "PowerSpy: Fine-Grained Software Energy Profiling for Mobile Devices," WIRLES 2005, Maui, HI, Jun. 13-16, 2005, pp. 1136-1141.

Gralla et al., How the Internet Works, Special Edition, 1997, Ziff-Davis Press, pp. 254 and 266-271.

International Search Report and Written Opinion for International Application No. PCT/US2014/047475 dated Nov. 25, 2014, 8 pages.

International Search Report and Written Opinion for International Application No. PCT/US2014/19920 dated Jul. 17, 2014, 8 pages.

Juels et al., "Cache Cookies for Browswer Authentication (Extended Abstract)," IEEE Symposium on Security and Privacy, Berkeley/Oakland, CA, pp. 301-305 (May 21-24, 2006).

Thiagarajan et al., "Who Killed My Battery: Analyzing Mobile Browser Energy Consumption," WWW 2012, Lynon, France, Apr. 16-20, 2012, pp. 41-50.

U.S. Office Action dated Jul. 23, 2015 for U.S. Appl. No. 13/660,733. 12 pages.

U.S. Office Action dated Oct. 23, 2014 for U.S. Appl. No. 13/660,733. 10 pages.

* cited by examiner

APPARATUS, SYSTEM, AND METHOD FOR AUDIO BASED BROWSER COOKIES

PRIORITY CLAIM

This application is a continuation of U.S. patent application Ser. No. 16/278,678, filed Feb. 18, 2019, which claims the benefit of and priority to U.S. Provisional Application No. 62/632,595, filed Feb. 20, 2018, and is a continuation-in-part of U.S. Non-provisional application Ser. No. 16/219,675, filed Dec. 13, 2018, which is a division of U.S. Non-provisional application Ser. No. 15/258,796, filed Sep. 7, 2016, entitled Apparatus, System, and Method for Digital Audio Services which claims priority to commonly-owned and assigned U.S. Non-provisional application Ser. No. 13/660,733, filed Oct. 25, 2012, U.S. Provisional Application No. 61/551,307, filed Oct. 25, 2011, and U.S. Provisional Application No. 61/670,491, filed Jul. 11, 2012, each of which applications is incorporated herein by reference.

TECHNICAL FIELD

This disclosure relates to portable devices and tailored Internet content. More specifically, the disclosure relates to use of Internet cookies and device IDs to coordinate tailored web experiences on devices with microphones.

BACKGROUND

Current portable interactive devices can be used to tag and identify audio via fingerprinting, speech recognition, or other listening techniques. Some devices have streamlined the process somewhat by automatically obtaining the radio frequency of a broadcaster so that RDS data identifying songs can be captured. Those devices employ a radio feedback loop or "sweeping" to obtain the radio frequency that the device originally receiving the broadcast is set to. However, those devices require a second radio transceiver, in addition to the device originally receiving the broadcast. Some inaccuracies can result, for example, when more than one broadcaster broadcasts the same or highly similar content.

DETAILED DESCRIPTION

Figure 1:
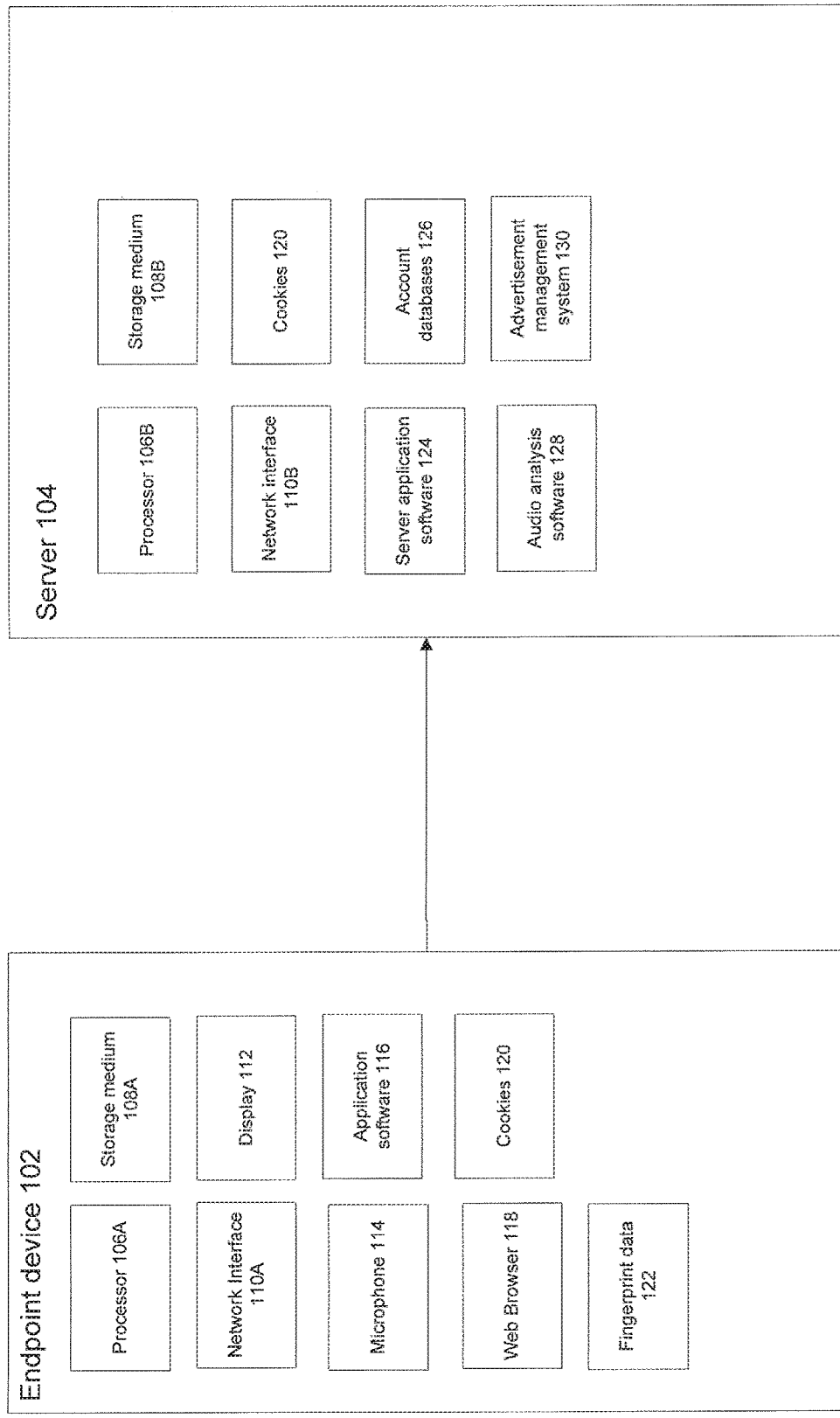
FIG. 1 is a block diagram of a system in accordance with the invention.

Internet experiences are tailored by previous use of the Internet. When a user accesses a given website, an Internet cookie is stored on their device. This Internet cookie influences the presentation of the given website and others. Often website influences take the role of advertisements.

For example, when a user visits a retailer's website, the retailer's website associates a cookie to the user. The method of association of the cookie varies. In some circumstances, a cookie is stored in digital storage of the browsing device. In other circumstances, the device is logged in to a user account for the Internet Browser (e.g., that additionally saves passwords, and account information) and the Internet cookie is then associated with the Internet Browser user account (and is therefore stored on cloud servers for that Internet browser). The cookie then causes advertisements for that retailer (or even specific items offered by that retailer) to show up on other websites that offer advertisement space.

This premise can be applied to speech recognition and audio fingerprinting such that visiting a given radio station, or TV station influences a user's experience on the Internet. A mobile device such as a cell phone can be set for active listening. While listening, audio can be compared to audio fingerprints or a predetermined word or string of words. When observed/heard by the mobile device, the system generates a cookie that in turn tailors a user's Internet content.

The Internet cookie may take a number of embodiments. In some embodiments, the Internet cookie is generated and saved locally on the mobile device. In some embodiments, the system stores the Internet cookie to a cloud server where the cookie is associated with a device ID/MAC address of the mobile device. In some embodiments, the system stores the Internet cookie on a cloud server and associates the cookie to a particular user account of an application such that the user account carries across multiple devices.

Examples of active use include, a mobile device employing an "always listening" or "active listening" application fingerprints an advertisement spot as observed playing on a specific radio station. A cookie is created for that advertisement that influences advertisements presented to the Internet browser on the listening mobile device. In response to a user with an associated cookie visiting a participating website, advertisements corresponding to the cookie are automatically purchased or credited to an advertisement account and displayed to the user.

In another example, a mobile device listens to an identified radio station (as identified via one or more audio fingerprints) during a specified period of time, such as a period where a radio personality is talking about a particular topic (e.g., a festival). The system generates a cookie based on the identification of the radio (or television) station and the timestamp to tailor web browser experiences to the particular topic (e.g., festival brochures).

In yet another example, a mobile device listens to ambient audio and performs speech recognition for various key phrases (e.g., "San Diego Comic Con"). The identification of the key phrase causes the system to generate a cookie that tailors web experiences (e.g., coordinates positioning of advertisements for San Diego Comic Con, accommodations thereto, and surrounding activities.

FIG. 1 illustrates one embodiment of a system 100 that uses the endpoint device 102 and a server 104. The endpoint device 102 may include a number of devices, worn or carried, by users (e.g., smartphones, cell phones, tablets, smart watches, laptops, personal assistants, home assistants, smart home appliances, desktop computers, etc.). Endpoint devices 102 are operated by a processor 106A, include a digital storage medium 108A (memory, disk space, solid state storage, etc.), a network interface 110A, a display 112, and a microphone 114. Endpoint devices 102 further include a diverse software suite including application software 116, web browsers 118, and data such as Internet cookies 120 and audio fingerprint data 122.

The server 104 similarly is operated by a processor 106B, includes a digital storage medium 108B, and communicates with the Internet using a network interface 110B. The server 104 may include any or all of: server application software 124, a user account database 126, Internet cookies 120, audio analysis software 128, and an advertisement management system 130. These components and modules are further broken down and described below.

Advantages of the system 100 include, among other things, development of closer ties to the content providers' listening audience, ability to secure additional profits from a share of product sales sold through the system 100, ability to sell more innovative and effective advertising concepts to clients, and ability to increase advertising rates from more targeted ad campaigns.

Advantages of the system 100 also include innovative advertising/marketing options, for example, use of coupon-like offers like "deal of the day" services where deals could be pushed by broadcasters or other content providers. Deals can be purchased in real time and used immediately. For example, a deal for lunch could be pushed by a content provider, purchased in real or near-real time, and used immediately as the purchaser heads out to lunch.

The fingerprint data 122 and the audio analysis software 128 may operate using music/songs or advertisements stored in a fingerprint database, (e.g., Audible Magic Ad Database, Gracenote, etc.). A person of skill in the art appreciates that a different database to store media content can be used, including a database managed by a content provider or third party (e.g., Shazam). The details of a particular user's taste in music can be stored in the user-account database 126.

Figure 2:
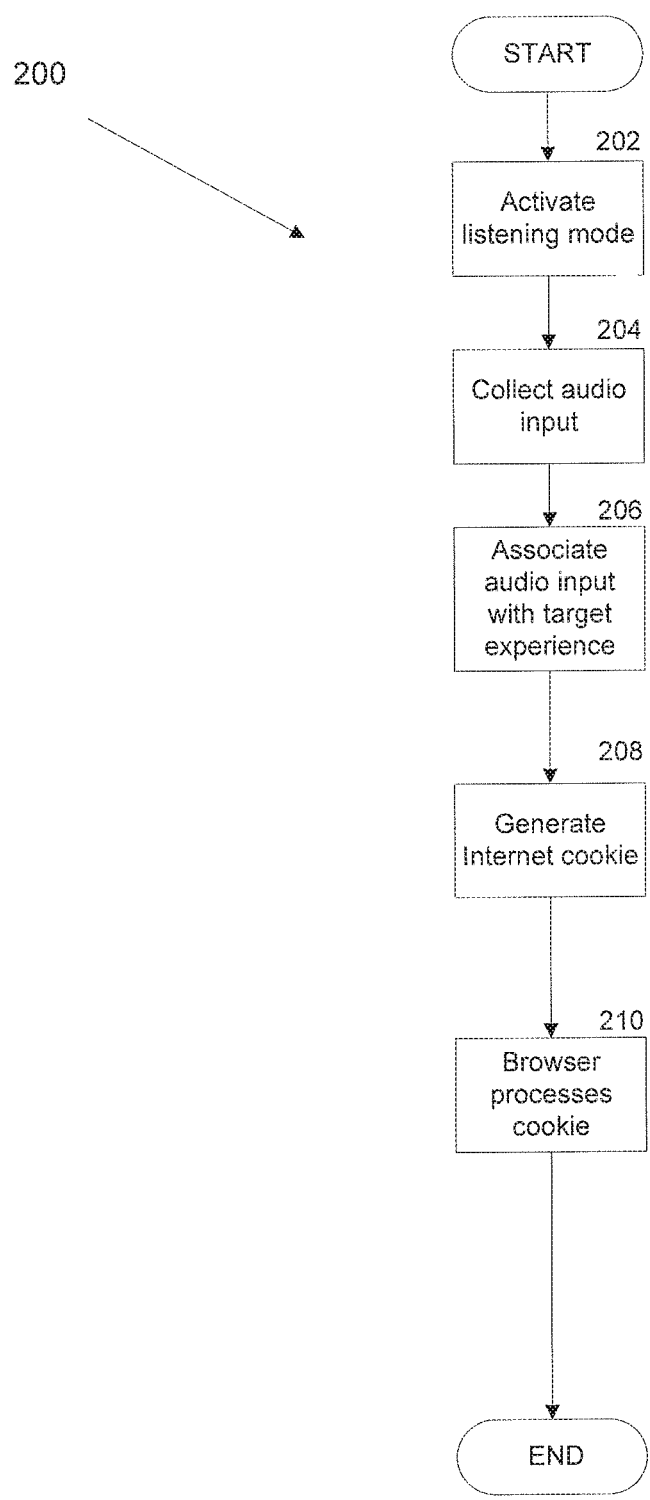
FIG. 2 is a flowchart of a tailored web interaction.

Referring to FIG. 2, a flowchart of a tailored web interaction is illustrated. In step 202, a listening mode of an endpoint device is activated. Listening modes may be always active ("always listening") or may be triggered either by ambient input or direct user input ("selective listening"). Always listening devices activate their respective microphones during all periods of operation (e.g., often including low power or sleep modes). Direct user input may include starting an application on the device, pressing a button to activate listening, or even voicing a command phrase. In some embodiments, device "listening" is multi-staged wherein a first stage listens merely for a command phrase. Once the command phrase is heard, a second stage of listening is activated and listens for a greater number of recognized speech and/or audio fingerprints.

In step 204, the endpoint device collects audio input and initiates analysis of the audio input. The audio input may be analyzed directly on the endpoint device or transmitted to the backend server for analysis. The analysis may include matching audio fingerprints, performing speech recognition, using timestamps, or any combination thereof.

In some embodiments, audio content is sampled in preparation for creating a spectrograph or other processing. Use of a 24 KHz audio rate for the sampling is suitable. Therefore, as part of the sampling, conversion from one rate to another can be used. For example, CD-quality audio occurs at 44.1 KHz. Down-sampling from 44.1 KHz to 24 KHz may be used to reduce data size of the sample. The sampling would occur between two samples at the higher rate of 44.1 KHz (see below, "x" and "0" indicate sample times):

x x x x x 44.1 KHz 0 0 0 24 KHz

The sample from the 44.1 KHz signal that immediately follows the ideal location can be used. This requires no interpolation, but a simple look up table can be used to map sample offsets in the larger sample rate to the smaller. The table can be queried to find the portions of the audio content at the 24 KHz rate that match the samples from the 44.1 KHz rate. For example, 147 samples from the 44.1 KHz signal can be read and the 80 samples in accordance with the 24 KHz rate of those 147 samples from the 44.1 KHz sample can be used. Those 80 samples would conform to both the 44.1 KHz and 24 KHz data rates. This can be repeated as necessary.

In step 206, the system associates the audio input with a target web experience. The target web experience is the desired effect of the tailoring (length, style, relevant URLs). For example, if the desired web experience is to share details about a festival on social networks, the target experience would place advertisements for the festival up through the date of the festival (but not after) on social networking websites. In another example, the audio input was an advertisement for a particular local service provider (e.g., a maid service), thus the target web experience would include advertisements for that maid service at a collection of highly trafficked websites.

In step 208, the system generates an Internet cookie including specifics of the target web experience such that users with the Internet cookie accessing web content on web browsers have their web experiences tailored by the Internet cookie. Traditionally, Internet cookies are generated for a specific browser. The specific browser is the one that visits the web page that causes the cookies to be generated in the first place. As the audio input is not associated with a particular browser, the cookie of step 208 is generated with various embodiments. In some embodiments, the cookie is generated with respect to all available browsers on the endpoint device. In order to access all browsers, the application software may have to include additional permissions. In some embodiments, the cookie is generated for a most used browser on the endpoint device as determined by any of: measured data use, measured battery usage, or a default browser setting.

In step 210, the user accesses a website using their endpoint device while having an associated cookie. While corresponding with the host server for the website, the cookie indicates terms for the tailoring of web content. In some circumstances there are multiple cookies with competing tailored experiences, these are sorted out by an advertisement management system. Processing of competing Internet cookies occurs based on preexisting agreements for cookie handling.

Ads are "pushed" through a real-time auction process facilitated by an exchange. Buyers of ads are connected to the exchange on one side and sellers of ads on the other side. Every time a consumer opens a website or launches an application that has a digital ad inventory, the ad impression is posted to the exchange with data describing the person behind the ad impression (this is influenced by Internet cookies). Buyers look at the data and bid. The highest bid places their ad. All of the cookie influence process happens in the time it takes the web or application page to open and display to the consumer.

Figure 3:
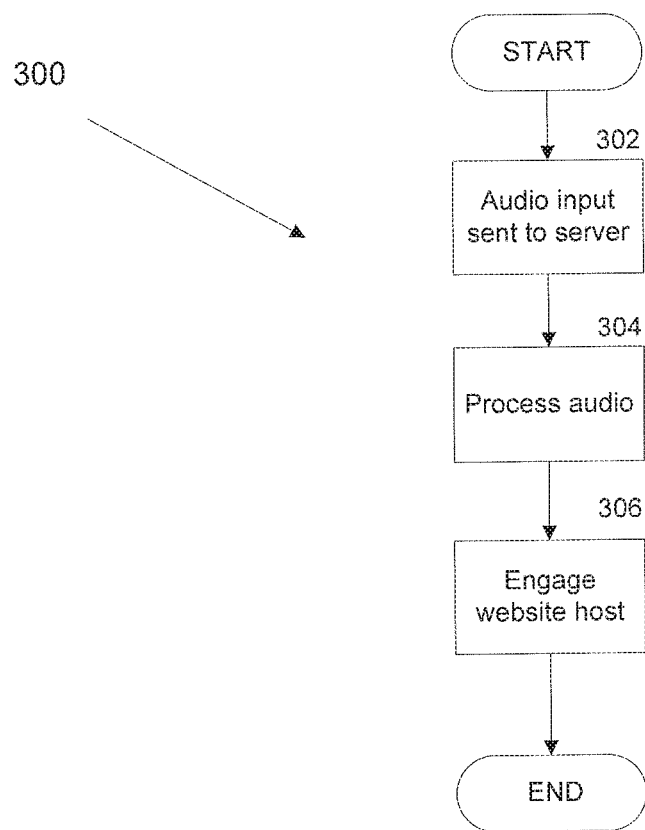
FIG. 3 is a flowchart of a server side cookie implementation.

Referring to FIG. 3, a flowchart of a server-side cookie implementation is illustrated. Traditional Internet cookie implementation includes cookies that are generated and stored locally on a given device, often specific to a particular browser. In some embodiments disclosed herein, the cookie is generated and is stored on a backend server. In such instances the cookie stores some different data than traditional Internet cookies.

In step 302, application software on an endpoint device communicates audio input and endpoint identification to a backend server. In step 304, the backend server processes the audio input and generates a corresponding cookie. The cookie includes data identifying the endpoint device or a user thereof. In step 306, the backend server engages one or more hosts of websites that are included in the target web experience. Engaging the hosts includes securing advertisements as indicated by the cookie with the hosts for the given endpoint device, or user. The endpoint device is identified by a MAC address, and the user via a user account. The cookie is stored as associated with either the endpoint MAC or a user account of the application software.

In embodiments where the user account is used to identify the cookie on the backend server, the cookie may include identifications of multiple user accounts. The inclusion of multiple user accounts enables the backend server to coordinate with hosts of websites relevant to target web experiences. For example, where the application software is not associated with the host of a relevant website, the cookie stores user account information for both the application software and the relevant website. This enables the backend server to identify the user to the host of the relevant website.

Figure 4:
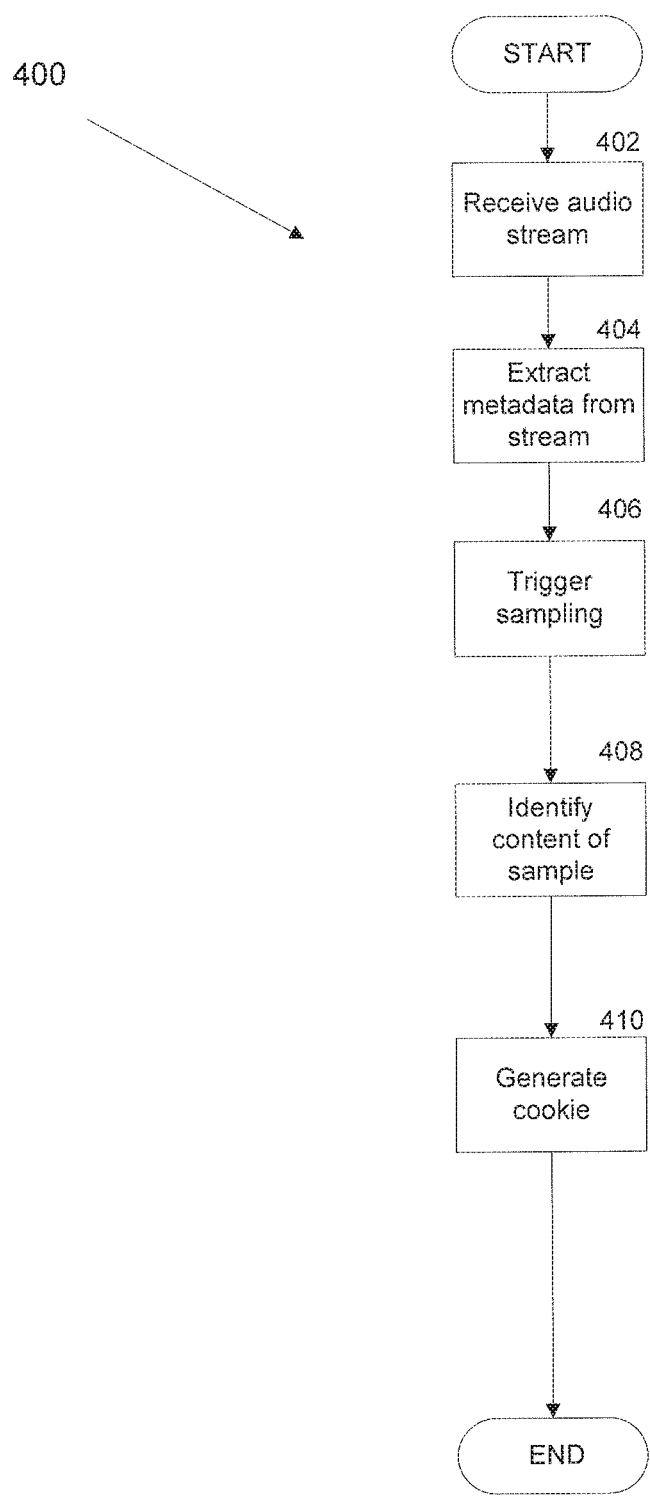
FIG. 4 is a flowchart of an audio input originating from the endpoint device.

Referring to FIG. 4, a flowchart of an audio input originating from the endpoint device is illustrated. The system contemplates that the audio input may be emitted by speakers locally on the endpoint device which in turn would use the local microphone to detect audio input. This enables an alternative to use of the microphone. In some embodiments, a digital copy of the audio input is used rather than a microphone to detect the audio input. Where sound is emitted and then detected by the same endpoint device, it is not necessary for the device to actually emit the sound (audibly) for the device to detect the audio input. The endpoint device may sample a copy of the audio input that is otherwise configured to be played by the speakers via application software. Evaluating the audio input in a manner that does not use the microphone reduces error from feedback, speaker quality, speaker volume, and ambient noise.

In step 402, an audio stream is received by the endpoint device. In many cases this may be streaming audio, internet radio, video with audio from a website, or other audio included data received by endpoint devices known in the art. In step 404, the endpoint device extracts metadata associated with the audio stream.

In step 406, the extracted metadata is used to identify sampling triggers. In one embodiment, RDS (Radio Data System), RDBS (Radio Broadcast Data System), or some other signal in the broadcast can be used to trigger a sampling. The length of a sampling can be received from the signal metadata. When a new song or advertisement starts during the broadcast, the signal which includes the new song's information can trigger the sample. In some embodiments, samples are collected using the microphone. In some embodiments, samples are collected via digital extraction of segments of the data stream.

The song/advertisement/conversation segment can be sampled for a predetermined length of time. Then, rather than sample again at some arbitrary, predetermined sample rate, a wait time can be calculated from the length of the sample and the audio length. For example, if the sample length is 30 seconds and the song length, which would be received from the signal, is three minutes, the wait time before sending a sample to the backend sever could be set to two and half minutes. The interval to the next sample could also be set to two and a half minutes. After the two and a half minutes, a new song would be played and, consequently, new content information from the signal could be received. Another sample could be then be taken and sent to the backend server for identification.

In step 408, the content of the sample is determined. In some embodiments, this determination can occur as described above. In some embodiments, metadata embedded in the extracted segments contains information about that sample. Metadata includes data about the audio stream.

In step 410, the system generates an Internet cookie according to any of the described embodiments herein.

Figure 5:
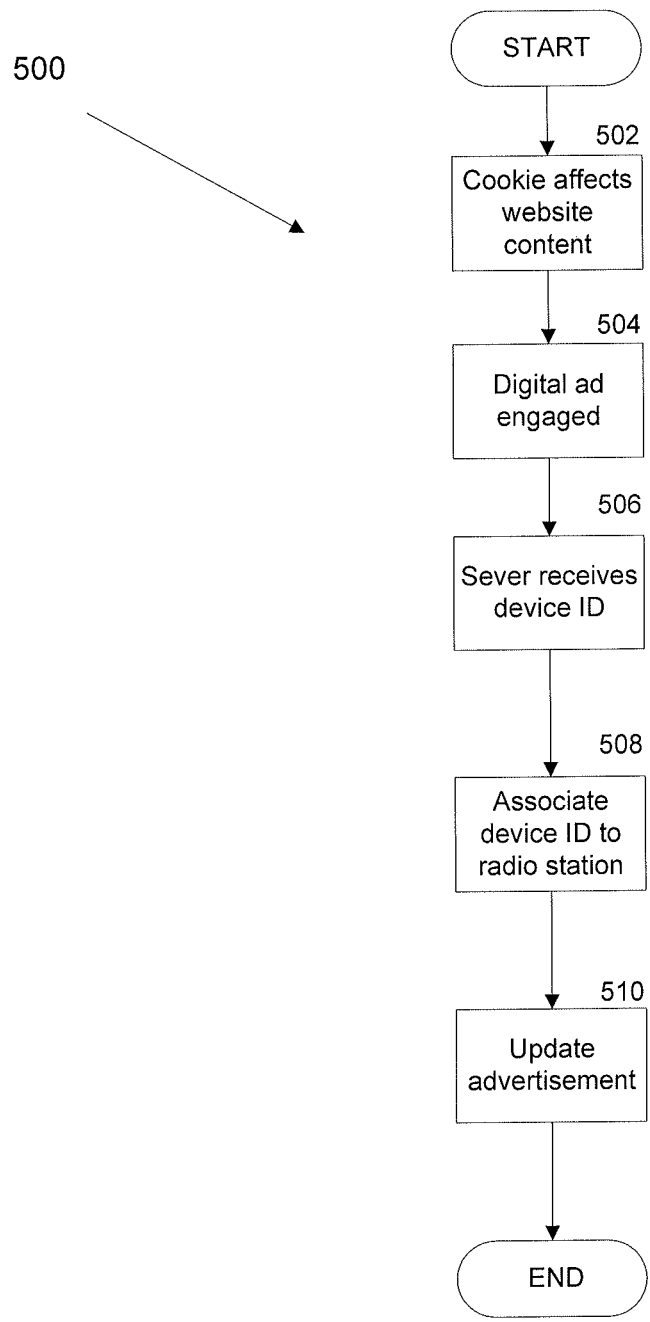
FIG. 5 is a flowchart of analytics development from echoed audio and web experiences.

Referring to FIG. 5, a flowchart of analytics development from echoed audio and web experiences is illustrated. In step 502, a user visits a website and a cookie generated as a result from detection of a radio station tailors advertisements thereon. In step 504, the user engages with the digital ad. In step 506, the server receives a device ID or cookie associated with the purchased impression. In step 508, the server then makes the assumption that the device ID/cookie is associated with a listener of the radio station that broadcast the ad. Over time, the server is able to increase or decrease the probability of this association based on future responses.

In step 510, the server inserts calls to action in the ads to drive immediate interactions to strengthen associations. This is essentially an echo campaign where the associations improve over time. This ongoing improvement is an important advantage. The server creates associations based on time synching digital buys to broadcast content and evaluating responses over time.

Figure 6:
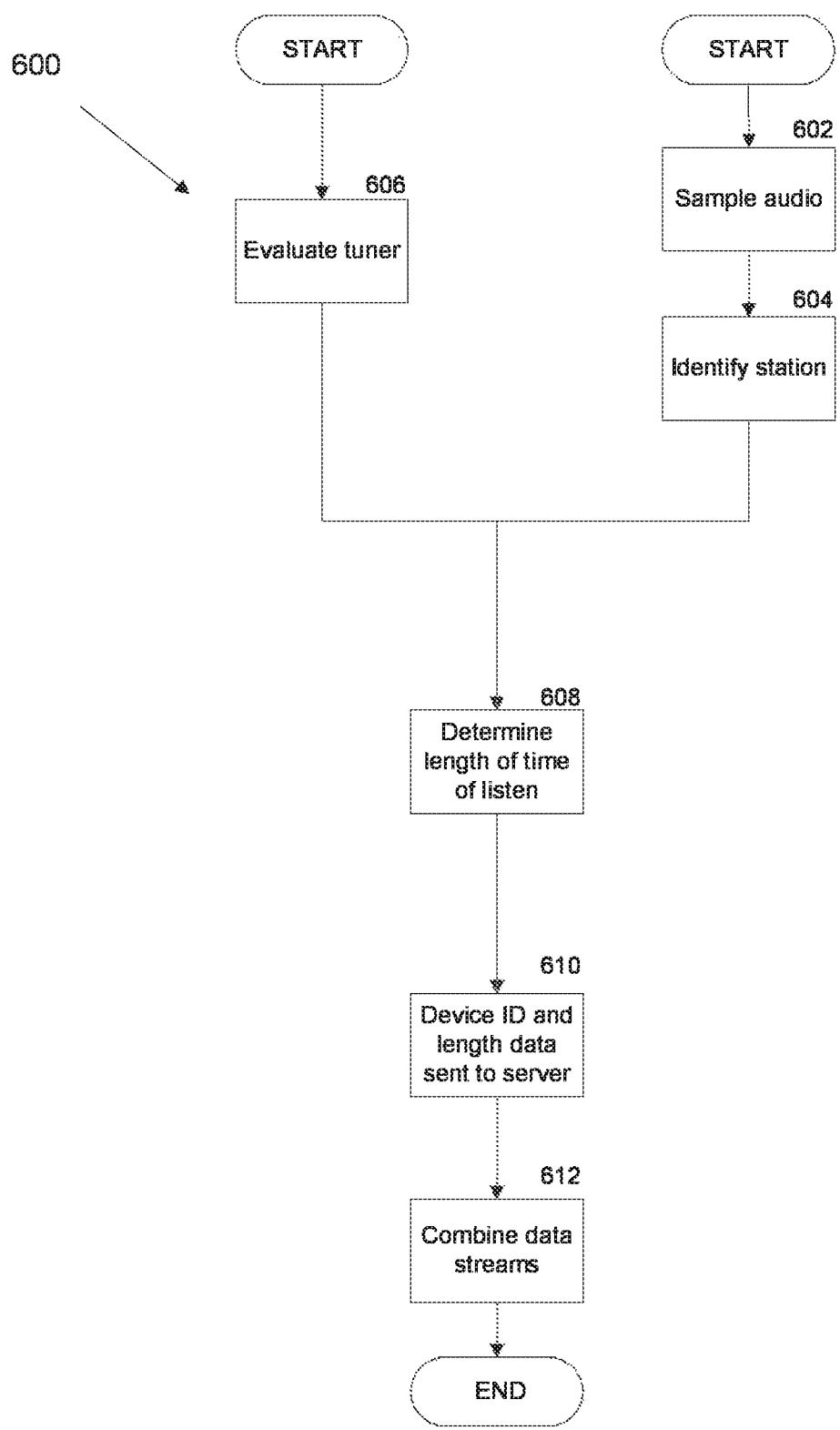
FIG. 6 is a flowchart of a broadcast radio rating system.

Referring to FIG. 6, a flowchart of a broadcast radio rating system is illustrated. In step 602, an endpoint device samples audio from an active radio station. In step 604, the system determines the radio station. Steps 602 and 604 can be alternatively performed by step 606. Where the endpoint device is a radio and includes a tuner, the radio station is determined based on the tuner setting.

In step 608, the system determines the length of time the user listens to the particular radio station. In step 610, the length of time and user account data is transmitted to a backend server. In step 612, the sever combines the data stream of step 610 with the data stream of the flowchart of FIG. 5. Together, these data streams enable novel analytics on radio listeners coordinated with advertisement interaction.

Figure 7:
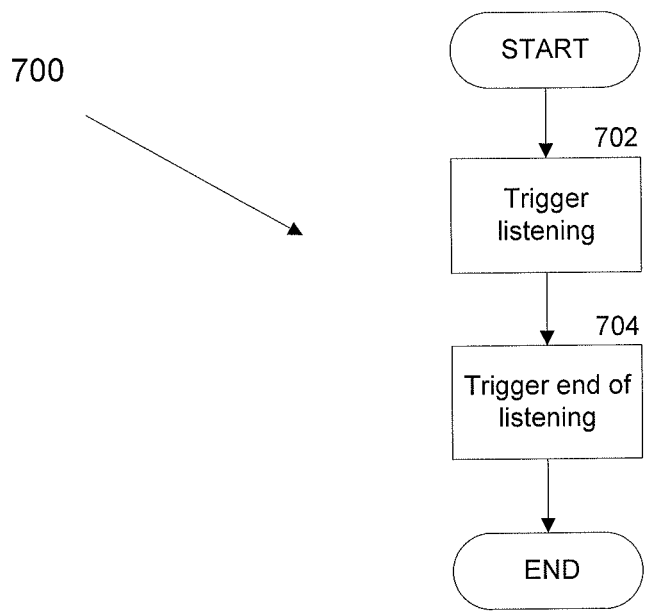
FIG. 7 is a flowchart of a triggering listening mode.

Referring to FIG. 7, a flowchart of a triggering listening mode is illustrated. "Selective listening" on devices can be triggered a number of ways. Selective listening is used to increase privacy and reduce power consumption on the endpoint device. In step 702, a triggering event occurs.

Triggering events may include a wide array of detectable activity. Endpoint devices include a number of local sensors that when active enable a multitude of detection techniques. In some embodiments, triggering events may depend on the location of the endpoint device, rate of change of the location of the endpoint device (i.e., velocity), time, detection of command phrases, and direct user input.

For example, where the rate of change of location is low, the endpoint device assumes it is not in a car and is therefore not listening for a car radio to be active. The velocity, or speed at which the endpoint is traveling, can be determined by a GPS function of the device, by using a speedometer in or on the user's vehicle, or some other device or method for determining velocity or speed. Information from a vehicle speedometer or other device could be delivered to the endpoint device which hosts the application software by Bluetooth, some other short-distance radio-wave-based protocol, some other wireless protocol, or some other data transfer method, either wired or wireless.

In addition to speed information, the endpoint device can receive location information from the vehicle as well. Speed information, location information, and the like can be sent to the device or derived by the device at predetermined intervals. Velocity can further be compared to a map to determine expected mode of transportation. For example, someone on a train may have a similar velocity to a car, but a map would show that they are traveling over tracks. Conversely when someone is on a road but going notably slower than traffic usually goes in that area, the system can determine the user is on a bike. Moreover, the direction in which the device is moving can be used as part of the basis for determining the listening mode.

As described above, the application software 116 can start as a result of a user interaction. In another embodiment, the application software 116 can automatically start based on the identification of an audible signal (e.g., a command phrase). For example, the device can be equipped with an application or device that detects an audible signal and, when the signal is detected, starts the application software. Such a listening device or application can be used to conserve battery power in the portable device at the same time as prevent a requirement that the listener/app-user start the application software themselves or constantly run the application software. In yet another embodiment, the application software may automatically start upon detection of embedded content, for example, RDS data, RDBS data, or some other embedded content. In another embodiment, the application software can be automatically terminated when the device or application software detects a particular audio signal or sound (e.g., an "off" command phrase, or metadata embedded in the audio stream indicating the listening should turn off).

In yet other embodiments, the application software can start automatically upon the activation of predetermined Bluetooth connections to the endpoint device (e.g., a car stereo). Doing so reduces the power consumption of the application from "always listening" to "selectively listening". In such an embodiment, the device on which the application software runs can include an accelerometer and a pressure sensor. An accelerometer can be a GPS transceiver that detects geographic movement or some other location-movement detection component. A pressure sensor can be a component that detects pressure in the form of sound waves. The application software or some other, related set of program instructions on the device can receive signals from both the accelerometer and pressure sensor to determine whether the application software 116 should start. In a preferred embodiment, the set of program instructions automatically starts the application software if signals from one or both the accelerometer and pressure sensor are at predetermined minimum values. For example, the application software could start when the signal from the accelerometer indicates a speed or rate of change of geographic location of the device over a predetermined minimum.

A predetermined minimum speed could be 10 mph. Further, the application software could start when the signal from the pressure sensor detected a decibel level over a predetermined minimum. A predetermined minimum decibel level could be 60 dB. Moreover, the predetermined minimum values could be input by a user or set to defaults. Additionally, the set of program instructions could receive the type of sound waves to determine whether to automatically start the application software. For example, in a preferred embodiment, only when the audio detected by the pressure sensor was determined to be music with a predetermined level of certainty would the application software automatically start.

It is to be understood that other data can be considered in determining whether to automatically start an application software. For example, the device or application software can be set to forbid the auto start or the auto start function can be further based on a predetermined period of time and/or geographic location (e.g., within a radius or predetermined distance of a broadcaster, signal, or other point of interest). Furthermore, each input to determine whether application software should automatically start can be further combined or separated. For example, the application software can be set to automatically start based solely on an accelerometer signal, a pressure signal, some other signal or input, or any combination thereof.

A non-audio or non-audible signature, or watermark, can be embedded in the broadcast content or signal and can be used as a trigger. The content provider can create the watermark based on the content of the audio itself. For example, as described herein, a non-audible watermark can be based on the audible tone of the content. The watermark can also be based on information related to the audio content or content provider. For example, for a song, the watermark may be created from the name of the advertiser or the product, or other offer-related information related to the advertisement can be used to create a watermark. The watermark can also be based on information related to the content provider, including the name of the broadcaster, the time the content was broadcast, or some predefined key value assigned to the content by the content provider or broadcaster. In yet other embodiments, a watermark can include a predetermined signal unrelated to the specific content in which it is embedded.

The content provider or broadcaster can embed a watermark into the broadcast signal. The device receiving the broadcast signal could then include a decoder to decode the broadcast signal to obtain the watermark. A watermark can include information that can be detected to trigger an application software or that can be decoded into audible or non-audible content or content that can be decoded into some other medium. For example, a watermark can be decoded into textual data for display by the user device, graphical data for display by the user device, or video for play by the user device. Different algorithms can be used to embed a watermark signal in broadcast content. Such algorithms include least significant bit (LSB) coding, phase coding, phase modulation, echo hiding algorithms, spread spectrum algorithms, and others. Those of skill in the art can appreciate that different watermarking algorithms exist and can be used to embed watermarking signals.

In step 704, the system stops listening based on a second triggering event. The second triggering event may be the ending of any of the discussed criteria for beginning listening, or similar input designated as an "off signal".

Methods for Identifying Content and Content Providers

The smartphone or portable device can use various methods to extract information from the content which the app-user will tag. In one embodiment, the portable device can obtain embedded content from the broadcast content, the embedded content providing an identifier for the content. The embedded content can also be used to identify the content provider, such as the broadcaster, vendor, advertiser, or other sponsor of the content, information about the provider such as radio frequency, call letters, nickname, and the like, type of content, title of the content, copyright information, time the content started, length of the content, information about the author or performer of the content, information about the owner, publisher, or label of the content, and any offer information related to the content, such as price, reduced price, coupon, ticket or ticket information, location, time limit, and the like. Embedded content can include RDS data, RDBS data, or the like along with the content, that data including. Such embedded content can be received by the portable device from a radio via Bluetooth, another radio-wave-based transmission protocol, or some other transmission technique. For example, in one embodiment, the radio or other device receiving the broadcast could transmit identifying data from embedded content over IP. In yet another embodiment, the device receiving the broadcast could retransmit, over a radio frequency, the embedded content for reception by the portable device. Embedded content can also be transmitted over wired communications like as well as wireless.

In one embodiment, the system 100 can include components or modules to "listen" to broadcasts and generate signatures in real or near-real time of the aired content. The system 100 can then store those signatures, as well as information about the content provider (e.g., broadcaster), for matching against signatures of tagged content and/or broadcaster information sent by devices.

The fingerprint data 122 or audio analysis software 128 can support the storage of standard audio files, for example, .WAV files that hold the signatures. In another embodiment, the library can support other, custom audio files. In yet another embodiment, the library can support non-audio signatures in which the data in the signature is a digital, non-audio representation of the signature. The audio types for which signatures can be created and used within the system 100 can include music, advertisements, spoken content, or some other type of audio broadcast or other transmission by a content provider.

Following is a description of one embodiment of fingerprinting. Sound is created by vibrating objects. A vibrating object causes pressure variations in the air which propagate outwards as waves. These sound waves are converted into neural impulses by the ear and perceived as sound by the brain.

Musical tones have four major characteristics:
Pitch: the frequency of the vibration. The higher the frequency the higher the perceived pitch.
Intensity: the loudness of the tone.
Duration: how long the tone lasts.
Timbre: the "quality" or "color" of the tone. Different instruments sound different, even when they play the same note; timbre captures this concept.

A pure tone is a vibration at only a single frequency. However, the notes played by real musical instruments are not pure in this sense. When a given note is played by an instrument, vibrations at several frequencies are simultaneously present. These extra frequencies are multiples of the fundamental frequency and are referred to as harmonics. So a viola playing the note "A" will simultaneously cause vibrations at 440 Hz, 880 Hz, 1320 Hz, etc. The timbre of a tone is largely determined by the relative distribution of energy in the harmonics. Different energy distributions (i.e., different relative intensities of the harmonics) are perceived differently by the brain. For example, a violin and a trumpet sound different. The distribution of a waveform's energy as a function of frequency is called a spectrum.

Figure 8:
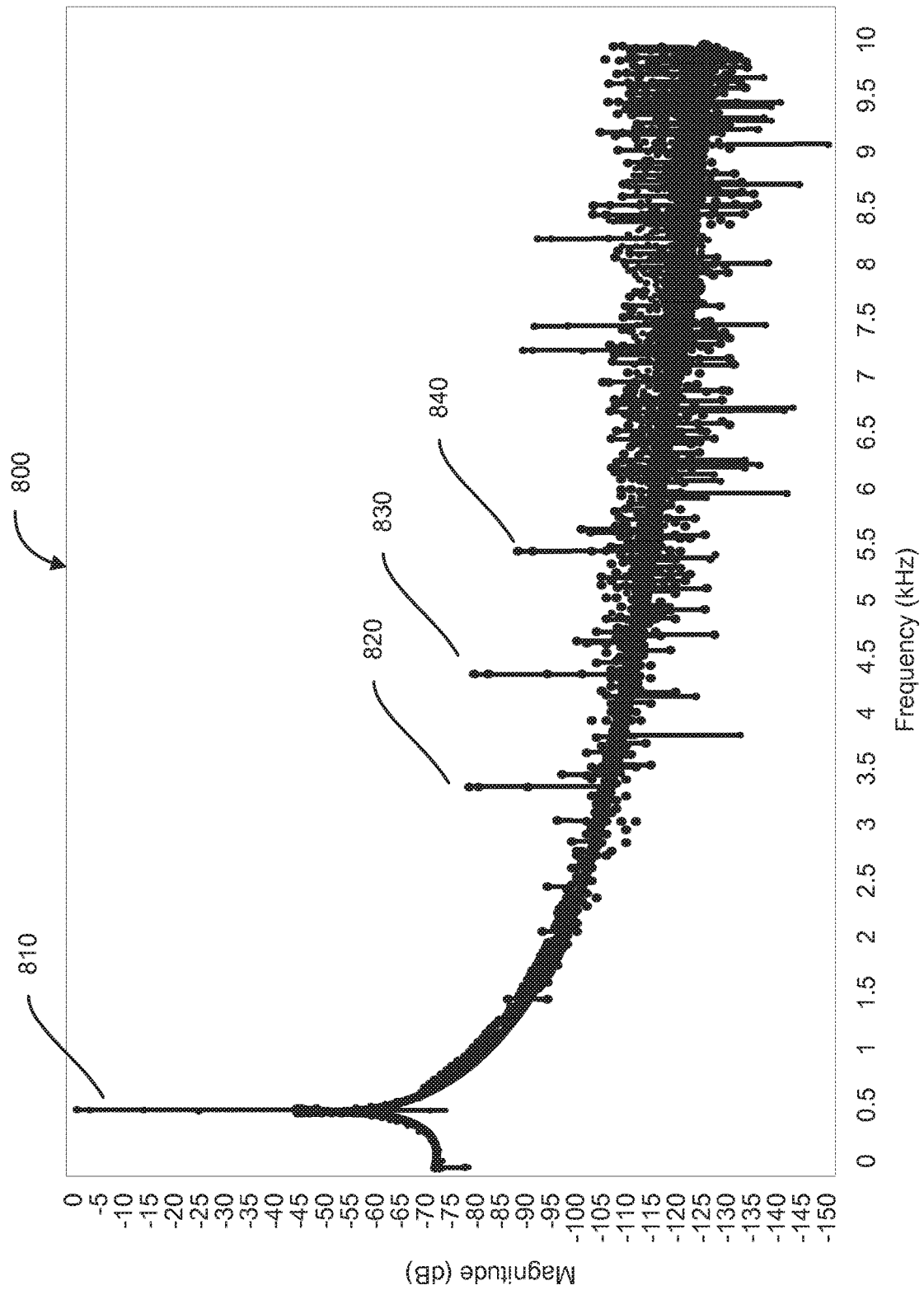
FIG. 8 is a graph depicting a spectrum created from processing audio stream content in accordance with an illustrative embodiment of the invention.

There are mathematical tools for analyzing a waveform to determine what frequencies compose it. The Discrete Fourier Transform (DFT)—which can be efficiently computed using an algorithm referred to as the Fast Fourier Transform (FFT)—is one such tool. FIG. 8 illustrates a graph 800 showing the spectrum of a pure 500 Hz tone.

There is a large spike 810 at 0.5 (the x-axis units are in KHz, so this is 500 Hz) which corresponds to the pure sine wave tone. The other "spikes," including spikes 820-840, are at least 70 dB down relative to the main spike 810, meaning that they are many times smaller in intensity (−10 dB is a factor of 0.1, −20 dB a factor of 0.01, −30 dB a factor of 0.001 and so on). These smaller spikes 820-840 are the result of noise.

Figure 9:
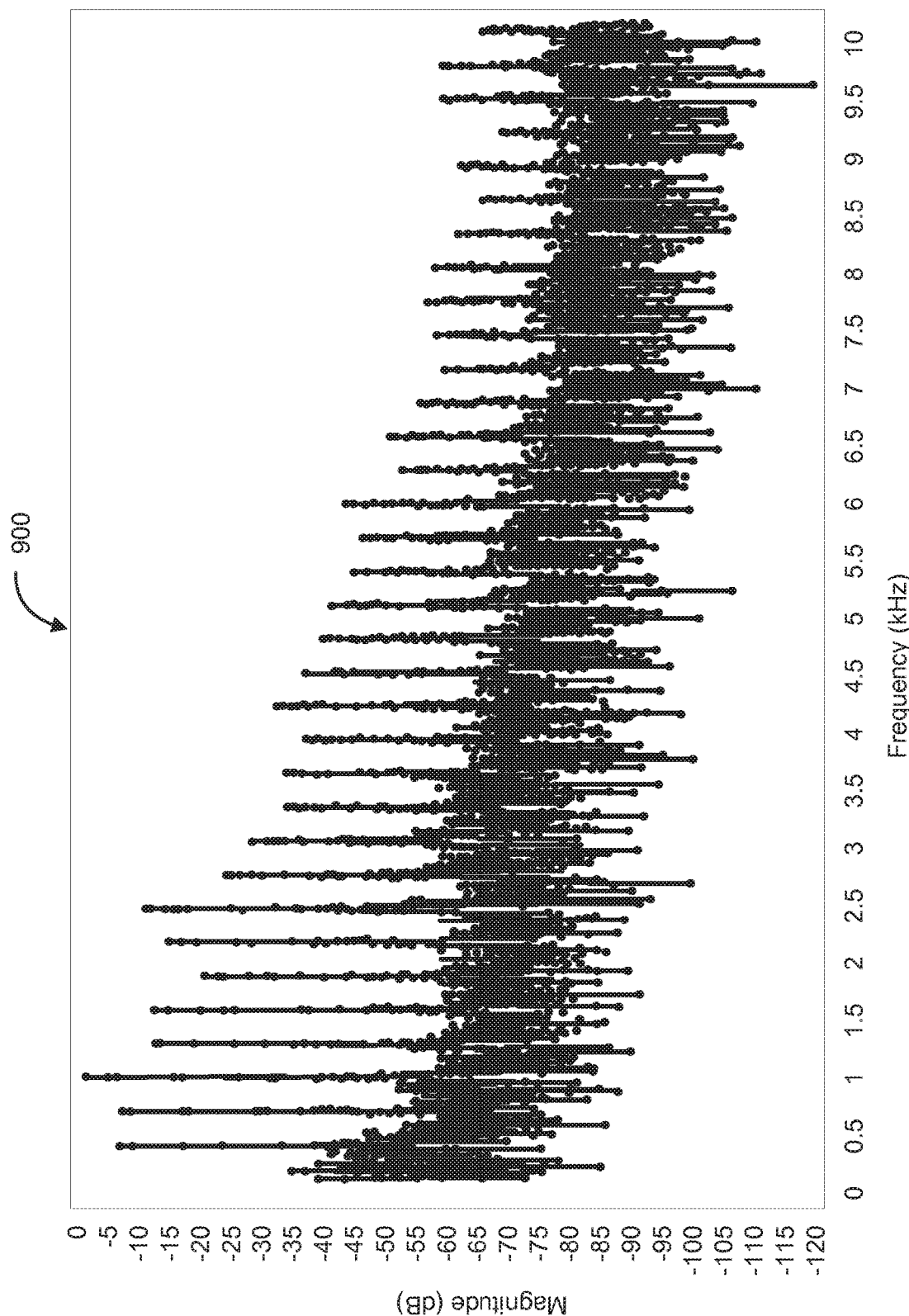
FIG. 9 is a graph depicting a spectrum created from processing audio from a viola in accordance with an illustrative embodiment of the invention.

FIG. 9 illustrates a graph 900 showing a spectrum of a viola playing a note. Data for the waveform for this note was captured with a microphone connected to a PC and was then analyzed using the FFT.

One of skill in the art can appreciate that in graph 900 many harmonics are present, each with a different intensity, yielding the viola's unique timbre.

Figure 10:
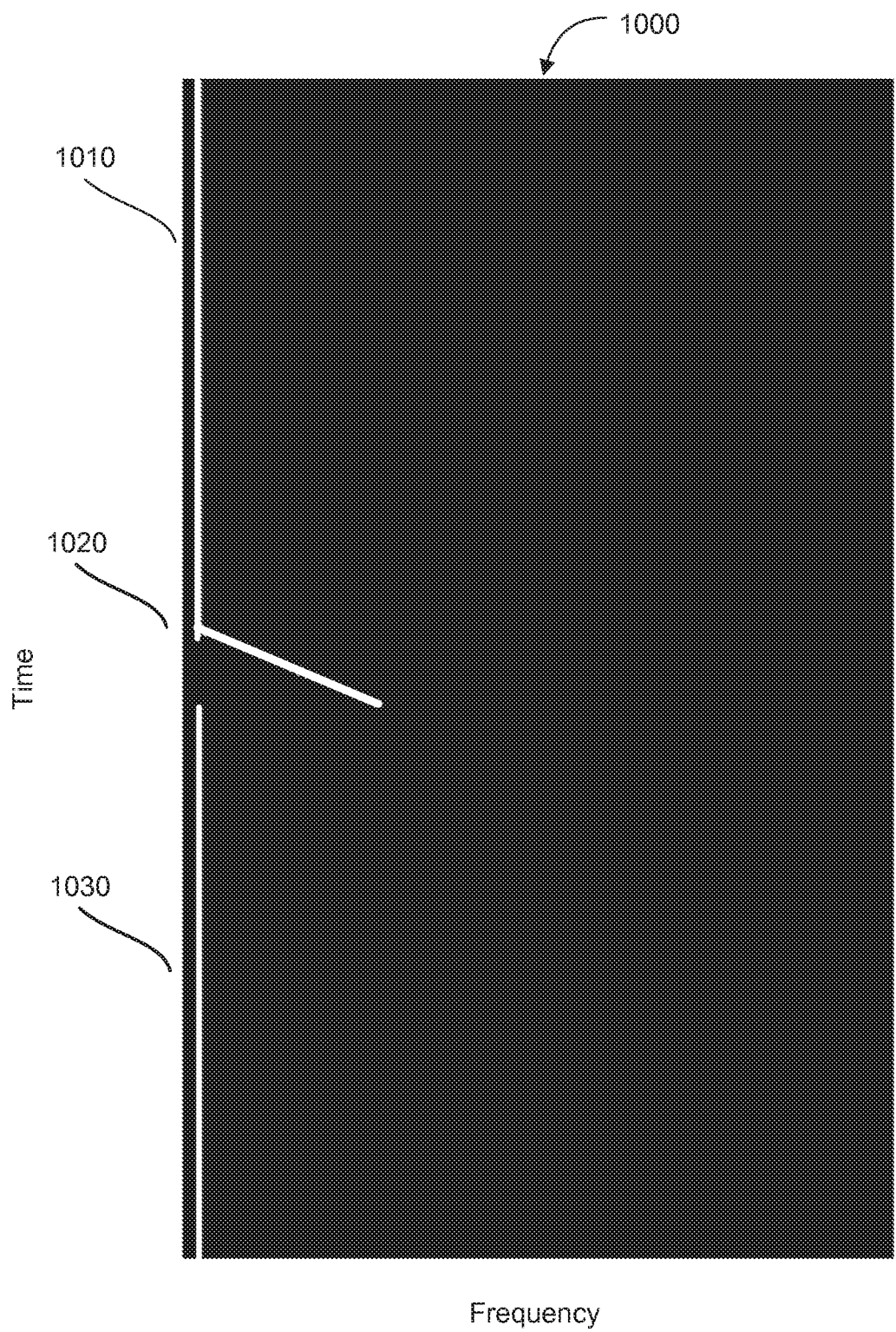
FIG. 10 is a spectrograph created from processing audio in the form of a pure tone in accordance with an illustrative embodiment of the invention.

In music, the note being played changes over time, and multiple instruments are often playing together simultaneously. It is therefore useful to look at how the spectrum of a waveform changes over time. A spectrograph is a visual representation of how the spectrum changes over time (spectrographs are sometimes called spectrograms as well). The top of a spectrograph is "time zero" and time increases as you move down the spectrograph. In other words, spectrographs can be read top to bottom like a book. The left of the spectrograph corresponds to low frequencies and the right to high frequencies. The brighter a point on the spectrograph, the greater the intensity of the frequency at that instant in time. Consider the spectrograph shown in FIG. 10. This spectrograph 1000 corresponds to a pure tone 1010, followed by a frequency ramp 1020, followed by a return to the pure tone 1030.

Figure 11:
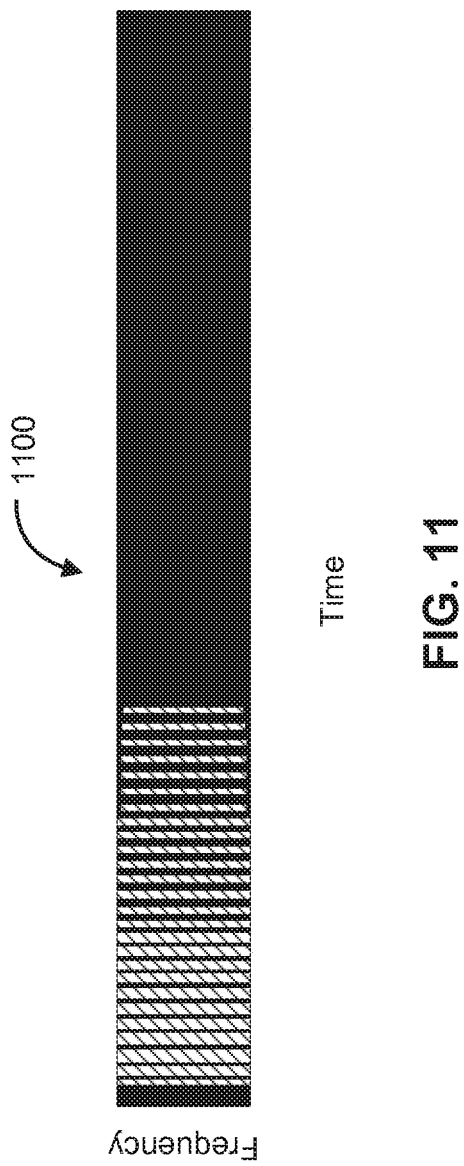
FIG. 11 is a spectrograph created from processing audio from a viola in accordance with an illustrative embodiment of the system.

The vertical length of the pure tone 1010 indicates that a pure tone is present for a period of time. The slanting line 1020 indicates that the frequency increases with time for a while (remember, time increases as you move down the graph and frequency increases to the right). Eventually, the frequency ramp ends, and the pure tone is resumed at the vertical length of the pure tone 1030. FIG. 11 illustrates a spectrograph 1100 for the viola playing the note whose spectrum is illustrated in FIG. 9.

Spectrograph 1100 illustrates that many frequencies are present and that they are more intense at the lower frequencies (the vertical stripes are whiter on the left); all the frequencies persist for the entire duration that the note is played. Also, the frequencies are constant for the duration of the note (the lines are straight).

Figure 12:
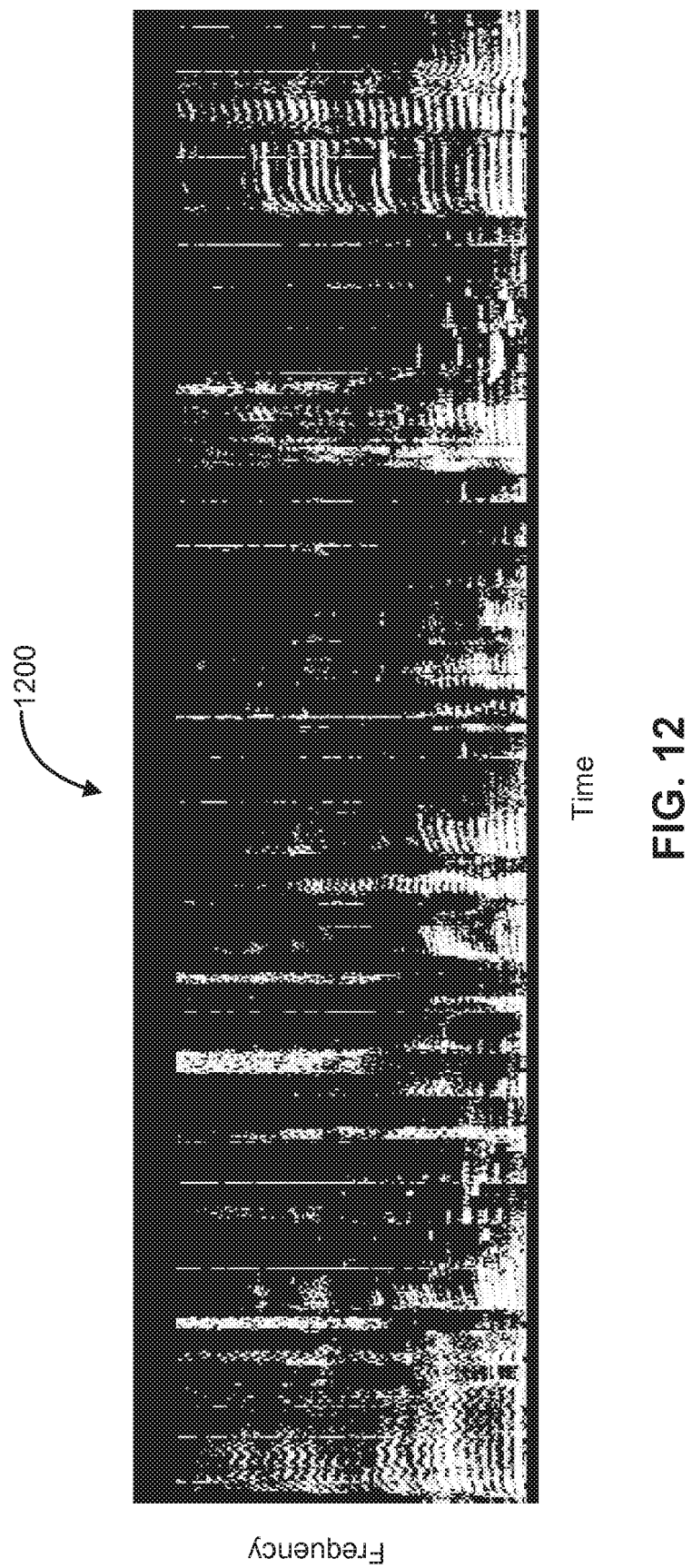
FIG. 12 is a spectrograph over a several second period from the song "Fly Me to the Moon" created in accordance with an illustrative embodiment of the system.

Of course, the spectrograph of music can be quite complex. For example, FIG. 12 shows a spectrograph 1200 over a several second period from the song "Fly Me to the Moon" by Frank Sinatra.

Figure 13:
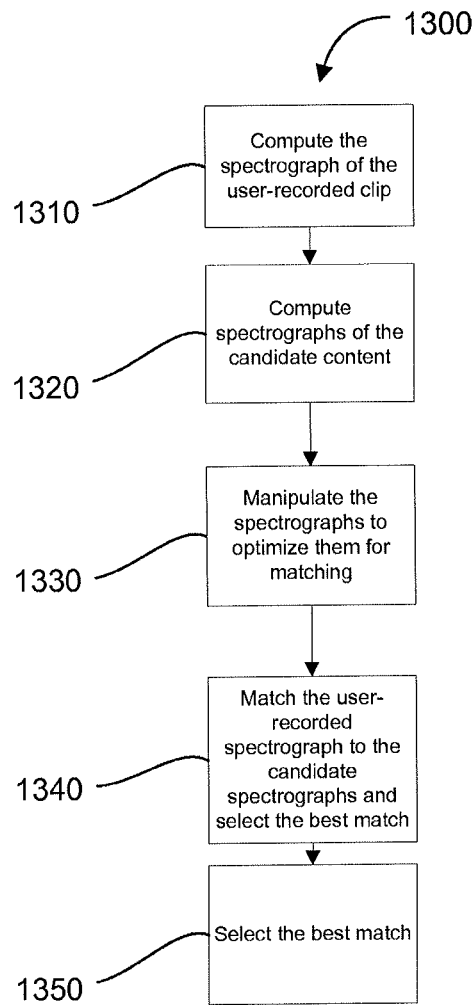
FIG. 13 is a flowchart of a method for matching audio content spectrographs in accordance with an illustrative embodiment of the invention.

FIG. 13 illustrates a method 1300 for matching a user-recorded clip to a song in accordance with the spectrograph descriptions above. At step 1310, spectrograph of the user-recorded clip is computed. In a preferred embodiment, 1024-point FFTs are used and the audio is assumed to be recorded in mono. In other embodiments, the audio can be recorded in stereo. A conversion from or to mono or stereo can be included in this step. For audio sampling at 44.1 KHz (the CD standard) this means that 43 spectra are computed each second, one every 23.3 ms. At step 1320, spectrographs of the candidate songs are computed. In a preferred embodiment, the candidates are assumed to be in stereo and are converted to mono before their spectrographs are computed.

At step 1330, the spectrographs are manipulated to optimize them for matching. In a preferred embodiment, for each spectrograph filter out (by setting the FFT coefficients to zero) all frequencies less than 300 Hz and greater than 8 KHz. This is done to eliminate low frequency and high frequency noise that might disturb the matching algorithm. During filtering, data representing energy at higher frequencies is removed. Also, each spectrograph can be normalized so that the highest power present at any frequency at any point in time maps to 0 dB. This normalization allows waveforms at different volumes to be matched to each other. Furthermore, the spectrographs can be scaled such that any energy at −25 dB or below maps to black, 0 dB maps to pure white, and values between −25 dB and 0 dB are linearly stretched over the grayscale from black to white. Scaling the spectrographs in this manner forces the matching process to only consider frequency content that is within 25 dB of the peak energy in the spectrograph.

At step 1340, the user-recorded spectrograph is matched to the candidate spectrographs. Note that the quality of the match can be expressed in terms of a Peak Signal to Noise Ratio (in dB) as opposed to mean square error. This is done for ease of data presentation. In a preferred embodiment, candidate segments are assumed to be longer than the user segment. Further, for each candidate segment, the user spectrograph can be overlaid on top of a candidate spectrograph (starting at the top). The formula applied is the following (it computes the Peak Signal to Noise Ratio in dB):

$$PSNR = 10 \log((255)^2/(\text{average mean square error}))$$

In a preferred embodiment, for each candidate spectrograph, starting at the top, overlay the user spectrograph. It will only cover a portion of the candidate spectrograph as the candidate is longer in time than the user clip. In a preferred embodiment, the mean-square error between the two is computed and stored. Further, in some embodiments, the user spectrograph is moved down by one row with respect to the candidate and the mean-square error for this position is computed and stored in a database or in memory by a component of system 100. This portion of step 1440 can be repeated until the entire candidate spectrograph has been searched. In other words, the user spectrograph can be "slid vertically down" the candidate spectrograph, one line at a time, so that a match can be searched. At each repetition, a PSNR can be computed for every offset. The result of this process is a PSNR trace. Each trace can show how the PSNR varies as the user spectrograph is slid through the candidate spectrograph.

At step 1350, the best match is selected. Once all the candidates have been searched, the candidate which exhibits the point with the smallest mean-square error can be selected as the match. Some action can be taken based on this declaration of a hit. For example, content can be purchased, coupon or offer can be sent to the user or application software 116, notify the advertiser, record the hit in the offer and user-account database, and the like.

In one embodiment of the system, the component of the system 100 (e.g., playlist generator 126) can compare a user recorded clip to various candidate clips. The spectrograph approach outlined above is one candidate for how this can be done. Accordingly, the following basic process can be applied:

Compute a signature for all the candidates
Compute a signature for the user's clip
Match the user's clip signature to the candidate signatures
Declare a "hit" based on the result of the matching algorithm and take some action (order a song, dispatch a coupon to the user, notify the advertiser, etc.)

Advantages of the spectrograph approach of method 1300 include effectiveness when matching is performed against a large set of songs and in noisy environments. Noisy environments can include open-air environments, noisy rooms, moving vehicles, and the like.

In another embodiment, a rule can be adopted that, in order for a match to be declared at step 1350, the PSNR of the peak must exceed the peak PSNR of all alternative candidates by some threshold. If it does not do so, the algorithm can return a "match failed" value.

In yet another embodiment, the nature of where the peak PSNR occurs can be characterized, i.e., to determine how sharp it is. When a peak PSNR is not relatively high or "sharp," this suggests that the confidence of a match can be gauged by the sharpness of the highest peak in a PSNR trace. The height or sharpness of the peak in the PSNR trace can correspond to the likelihood of a match. Furthermore, it is possible to identify a matching trace based purely on peak sharpness even when some other candidate match exhibits an overall higher PSNR value.

Various measures of peak sharpness are possible. One such measure includes the following:

For a given trace, find the peak PSNR point. Consider this point to occur at an offset of "0". Let the peak value in the trace be PSNR(0), the value just to the left of the peak be PSNR(1), the value just to the right of the peak be PSNR(1), etc.

Compute the peak sharpness function as follows:
```
lp=rp=0;
for(i=-N; i<0; i++){
if(PSNR(i+1)>PSNR(i)) lp+=(PSNR(i+1)-PSNR(i))^2;
else lp-=(PSNR(i+1)-PSNR(i))^2;
}
for(i=0; i<N; i++){
if(PSNR(i+1)>PSNR(i)) rp-=(PSNR(i+1)-PSNR(i))^2;
else rp+=PSNR(i+1)-PSNR(i))^2;
}
if(lp<rp) metric=lp;
else metric=rp;
```

Note that in the above pseudocode we consider N pairs to the left of the peak and N pairs to the right of the peak for some N. For a sharp peak, all the pair differences to the left of the peak yield positive values and all the pair differences to the right of the peak yield positive values too, because the peak increases monotonically and decreases monotonically. For a non-sharp peak some pairs may cause lp (or rp) to decrease because the peak is not monotonic. Furthermore, for a sharp peak, the peak rises substantially with respect to its overall background value, increasing the value of lp and rp. We then choose as our peak sharpness measure the smaller of lp or rp. The smallest value is chosen since large lp or rp values can be obtained by a steep rise in the PSNR curve to a stable value or by a steep drop in the PSNR curve from a stable value. In other words, we require both the left and right values (lp and rp) to be large in order to have a sharp peak.

In one embodiment, where ambient noise may otherwise interrupt the content signature, a match can still be determined based on a predetermined ratio of the highest peak sharpness found to the second highest peak sharpness found. For example, a threshold on the order of 10 can be reasonable: i.e., if the highest peak sharpness measure found exceeds the second highest by a factor of at least 10, then a match can be declared. Otherwise, a match is not declared. Note that the size of this ratio is a measure of the confidence that a correct match is found. In yet other embodiments a ratio in which the highest peak sharpness exceeds the second highest by a factor of 5 may determine a match.

The invention claimed is:

1. A method comprising:
  receiving, by an application running on an endpoint device configured to emit ambient audio via a speaker, a digital copy of an audio input, wherein the application is configured to detect audio via a microphone of the endpoint device;
  extracting metadata from the digital copy of the audio input;
  responsive to determining that the metadata includes a sampling trigger, capturing a sample of the ambient audio based on parameters indicated by the sampling trigger; and
  generating a cookie based on the sample, wherein the cookie is associated with an identifier of the endpoint device.

2. The method of claim 1, further comprising:
  determining an available Internet browser to link the cookie to based on either of:
    an Internet browser with a highest measured data use of installed browsers installed on the endpoint device; or
    an Internet browser with a highest measured battery usage of installed browsers installed on the endpoint device.

3. The method of claim 1, further comprising:
  presenting content corresponding to the cookie at a webpage on the endpoint device.

4. The method of claim 3, wherein a location of the content on the webpage is determined based on the cookie.

5. The method of claim 1, wherein the metadata includes a sampling length of the sampling and an audio length of ambient audio data to be captured during the sampling.

6. The method of claim 5, further comprising:
  determining, based on the sample length and the audio length of the sample, a wait time that indicates a time period between the triggering and sending the sample to a backend server.

7. The method of claim 1, wherein capturing the sample comprises digitally extracting segments of the digital copy of the audio input.

8. The method of claim 1, wherein the cookie identifies the endpoint device and a characteristic of the audio input.

9. The method of claim 1, wherein the sampling trigger is a Radio Data System signal or a Radio Broadcast Data System signal.

10. An endpoint device comprising:
  a listening apparatus configured to receive audio data played locally by a device; and
  a memory including instructions that when executed cause the endpoint device to perform actions comprising:
    receiving, by an application running on the endpoint device, a digital copy of an audio input, wherein the application is configured to detect audio via the listening apparatus of the endpoint device;
    extracting metadata from the digital copy of the audio input;
    responsive to determining that the metadata includes a sampling trigger, capturing a sample of the audio data based on parameters indicated by the sampling trigger;
    generating a cookie based on the sample, wherein the cookie is associated with an identifier of the endpoint device; and
    determining an available Internet browser to link the cookie to based on either of:
      an Internet browser with a highest measured data use of installed browsers installed on the endpoint device; or
      an Internet browser with a highest measured battery usage of installed browsers installed on the endpoint device.

11. The endpoint device of claim 10, further comprising:
  presenting content corresponding to the cookie at a webpage on the endpoint device.

12. The endpoint device of claim 11, wherein a location of the content on the webpage is determined based on the cookie.

13. The endpoint device of claim 10, wherein the metadata includes a sampling length of the sampling and an audio length of ambient audio data to be captured during the sampling.

14. The endpoint device of claim 13, further comprising:
  determining, based on the sample length and the audio length of the sample, a wait time that indicates a time period between the triggering and sending the sample to a backend server.

15. The endpoint device of claim 14, wherein capturing the sample comprises digitally extracting segments of the digital copy of the audio input.

16. The endpoint device of claim 10, wherein the cookie identifies the endpoint device and a characteristic of the audio input.

17. The endpoint device of claim 10, wherein the sampling trigger is a Radio Data System signal or a Radio Broadcast Data System signal.

18. A non-transitory computer readable storage medium storing instructions that when executed cause a processor to perform actions comprising:
  receiving, by an application running on an endpoint device configured to emit ambient audio via a speaker, a digital copy of an audio input, wherein the application is configured to detect audio via a microphone of the endpoint device;
  extracting metadata from the digital copy of the audio input;
  responsive to determining that the metadata includes a sampling trigger, capturing a sample of the ambient audio based on parameters indicated by the sampling trigger; and generating a cookie based on the sample, wherein the cookie is associated with an identifier of the endpoint device.

19. The non-transitory computer readable storage medium of claim 18, the actions further comprising:
    determining an available Internet browser to link the cookie to based on either of:
        an Internet browser with a highest measured data use of installed browsers installed on the endpoint device; or
        an Internet browser with a highest measured battery usage of installed browsers installed on the endpoint device.

20. The non-transitory computer readable storage medium of claim 19, the actions further comprising:
    presenting content corresponding to the cookie at a webpage on the endpoint device.

\* \* \* \* \*